United States Patent [19]

Aldenhoven

[11] 4,033,491
[45] July 5, 1977

[54] TAPE RECORDER MECHANISM RESPONSIVE TO TAPE STOPPAGE

[75] Inventor: Ghislanus Matheus Antonius Maria Aldenhoven, Eindhoven, Netherlands

[73] Assignee: U.S. Philips Corporation, New York, N.Y.

[22] Filed: Aug. 29, 1975

[21] Appl. No.: 609,015

[30] Foreign Application Priority Data

Sept. 2, 1974 Netherlands ............... 7411602

[52] U.S. Cl. ........................... 226/11; 74/89; 192/125 B; 226/45; 226/48; 226/174; 242/186; 360/69; 360/137
[51] Int. Cl.² ............... B65H 25/12; B65H 25/32
[58] Field of Search ............... 226/11, 46, 48, 45, 226/174; 360/69, 137; 242/186; 192/125 B; 200/61.17, 61.39; 74/89

[56] References Cited

UNITED STATES PATENTS

| | | | |
|---|---|---|---|
| 3,563,493 | 2/1971 | Bielke et al. | 242/186 |
| 3,620,429 | 11/1971 | Kozu et al. | 226/11 |
| 3,754,695 | 8/1973 | Suzuki | 226/174 |

*Primary Examiner*—Bruce H. Stoner, Jr.
*Attorney, Agent, or Firm*—Frank R. Trifari; David R. Treacy

[57] ABSTRACT

A tape recorder, in particular a cassette recorder, with an automatic stop device, which during stoppage of the tape switches off the apparatus and releases the play button. During tape stoppage a rotatably journalled drive wheel is brought into contact with the flywheel with its circumference, after which said flywheel drives a force-transmitting member, preferably via a reduction gear, and the latching slide is released.

13 Claims, 7 Drawing Figures

TAPE RECORDER MECHANISM RESPONSIVE TO TAPE STOPPAGE

BACKGROUND OF THE INVENTION

1. Field of the Invention

The invention relates to a magnetic-tape recording and/or playback apparatus, in particular a cassette player or recorder, (hereinafter referred to simply as a tape recorder) comprising: a depressible play button, a command member which is connected to the depressible play button and which is movable thereby, a movable and spring-loaded latching member which cooperates with said command member in the depressed condition, a capstan, a flywheel which is coupled to the capstan and drivable by a motor, a tape stoppage detection device, which comprises a component which during tape stoppage performs a movement which is characteristic of said condition, and an automatic stop device for automatically switching off the apparatus when the tape transport stops, said stop device comprising a movable frame plate which during tape stoppage can be moved by the tape stoppage detection device, so that a cooperation is obtained between the flywheel and the latching member by means of a force transmitting member which cooperates with the latding member at a first end for releasing said member against the spring load.

2. Description of the Prior Art

Such a tape recorder is known from U.S. Pat. No. 3,754,695. Said known apparatus comprises a tape-stoppage detection device with a gear-wheel disposed on the capstan, which gear-wheel engages an idler wheel which is journalled on a lever for free rotation. The idler wheel drives a third gear-wheel, which is rigidly mounted on a spindle which is in contact with the pressure roller of the apparatus. The third wheel spindle is mounted in a bracket, which is rotatable about a spindle fastened to the lever on which the idler wheel is journalled for free rotation. The three gear-wheels all have the same dimensions, so that the spindle which is in contact with the pressure roller rotates with the same speed as the capstan. Moreover, the third wheel spindle and capstan spindle have the same diameter, so that during tape transport no slip occurs between the pressure roller and the two spindles.

In the event of tape stoppage the pressure roller comes to a standstill. The spindle which is in contact with the pressure roller, however, is still driven by the gear-wheel which is disposed on the capstan and therefore performs an unwinding movement on the circumference of the pressure roller. By means of suitable elastic means the spindle is constantly held in engagement with the pressure roller. As the spindle rolls over the circumference of the pressure roller, the movement characteristic of the situation of tape stoppage is obtained, namely a tilting movement of the bracket around the spindle of the idler wheel. The tilting movement is transmitted to an unlatching lever which at one end is pivotably connected to a latching member, which consists of a latching slide. On the capstan near the flywheel an unlatching cam is provided. Because of the tilting movement the free end of the unlatching lever is brought within the range of the cam, so that the flywheel will hit the free end thereof. The force which is thus exerted on the unlatching lever by the flywheel is transmitted to the latching member by the lever, so that said member is unlatched. In this known device the unlatching lever thus both has the function of a movable frame plate, which is moved by the tape-stoppage detection device during tape stoppage, and of a force-transmitting member, for unlatching the latching slide against the spring load.

A drawback of the known tape recorder is that the latching slide is inlatched abruptly and with an impact. This means that momentaily great forces are exerted on the components of the stop device. Moreover, the impact increases the number of annoying switching noises. The nature of the stop device described further demands a certain amount of mounting space in the vicinity of the pressure roller and the capstan. Such space is not always available, in which cases the described stop device cannot be used. A further drawback is that the stop device does not respond to stoppage of the take-up reel in those cases in which the supply reel is not yet completely empty. Such a situation may for example occur in the case of a cassette which does not function entirely correctly because of blocking of the take-up reel. As the tape-stoppage detection device cannot detect such a situation, unwinding of the tape continues, thus giving rise to looping of the tape in the cassette.

SUMMARY OF THE INVENTION

It is an object of the invention to provide a tape recorder of the type mentioned above which minimizes switching noise.

According to the invention, a rotably journalled drive wheel is mounted on the frame plate. By movement of the frame plate during tape stoppage the drive wheel circumference is brought into contact with the flywheel and is thus caused to move, the force-transmitting member being drivably coupled to the drive wheel at a second end.

In an embodiment which automatically ensures that there is always sufficient force available for unlatching the latching member the frame plate of the stop device is journalled pivotably about a pivoting spindle which is rigidly connected to stationary parts of the apparatus, and the second end of the force-transmitting member is drivably coupled to the drive wheel at such a side of the pivoting spindle that at least one component of the reactive force produced by the drive means acts in a direction from the drive wheel to the flywheel.

In view of the effective use of the available mounting space, in another important embodiment a number of rotatably journalled cooperating gear-wheels are disposed on the frame plate which wheels together constitute a gear-reduction, by means of which the speed of rotation of the drive wheel can be reduced to a lower speed of rotation of a last reduction wheel with which the drivable second end of the force-transmitting member cooperates.

Further, to permit wide variation in the manufacturing and assembly tolerances of the components used, the force-transmitting member consists of a flexible pulling member, such as a cord, of which said second end is attached to a winding drum which is connected to said last reduction wheel of the stop device.

To automatically ensure that the stop device is reset to the initial position, the command member is coupled to a stop pin, the stop device being provided with a spring which keeps the frame plate elastically pressed against the stop pin in the situation that it is not moved by the tape-stoppage detection device. The stop pin projects through a slot in the frame plate, which slot has a length which is greater than the travel of the stop pin and a width which at the location of the stop pin with the play button depressed is sufficiently great to allow the frame plate to freely perform its movement during tape stoppage, and at the location of the stop pin with unlatched play button (switched off) is slightly wider than the stop pin, the width of the slot between said two locations gradually decreasing and the slot extending is such a direction that the frame plate, after unlatching of the play button by the stop pin, is returned to its initial position.

In various known tape recorders which are suitable for cassettes, for example as disclosed in U.S. Pat. No. 3,737,600, the apparatus is switched off by means of a tape stoppage detection device which consists of a differential mechanism. The differential mechanism comprises an output drive member whose direction of rotation can be changed which member during tape transport continuously rotates in a first direction and during tape stoppage in a second, opposite direction. In an embodiment of the invention which is suited for cooperation with such a tape stoppage detection device a sensor is disposed on and is connected to the frame plate, with an end which is remote from the frame plate, at least during tape transport, in resilient engagement with the output drive member of the differential mechanism.

A further embodiment, which in comparison with simple sensing of the direction of rotation of the drive member of the differential mechanism by means of friction has the advantage of reduced frictional losses and a more reliable drive of the frame plate of the stop device, is characterized in that the drive member of the differential mechanism whose direction of rotation can be changed comprises: a differential disk, which is provided with a round raised first cam ring which comprises a number of cams with a sawtooth profile, which cams are arranged at some distance relative to each other with interspaces therebetween and which during tape transport move in the direction with the gradual sloping edge of the profile leading, as well as a second cam ring which directly adjoins the first cam ring and which is rotatable relative thereto to a limited extend, which second cam ring is provided with cams with raised generally symmetrical profile, which cams are also arranged at some distance relative to each other with interspace therebetween, the slopes of the sawtooth profile of the first cam ring and the gradual slopes of the second cam ring being substantially equal to each other and the second cam ring being rotatable relative to the first cam ring between an angular position in which the two profiles locally substantially coincide during tape transport, so that the sensor of the stop device is first moved up, against a gradually rising edge of a sawtooth profile and is subsequently moved down along a falling edge of a pentagonal profile, then arriving at the gradually rising edge of the next sawtooth profile; and an angular position during tape stoppage in which the second cam ring is rotated by the sensor until the sensor hits the steep edge of a cam of the first cam ring.

In yet a further embodiment of the invention fast winding and rewinding of the tape can take place freely. This embodiment is characterized in that the sensor is pivotable relative to the frame plate in a direction substantially perpendicular to the frame plate and that the command member is coupled to a sensor lifting cam, which when the play button is depressed releases the sensor and when the play button is released lifts the sensor off the differential disk.

BRIEF DESCRIPTION OF THE DRAWINGS

The invention will now be described in more detail with reference to the drawing, in which.

In the Figures corresponding parts bear corresponding reference numerals.

DESCRIPTION OF THE PREFERRED EMBODIMENT

Figure 1:
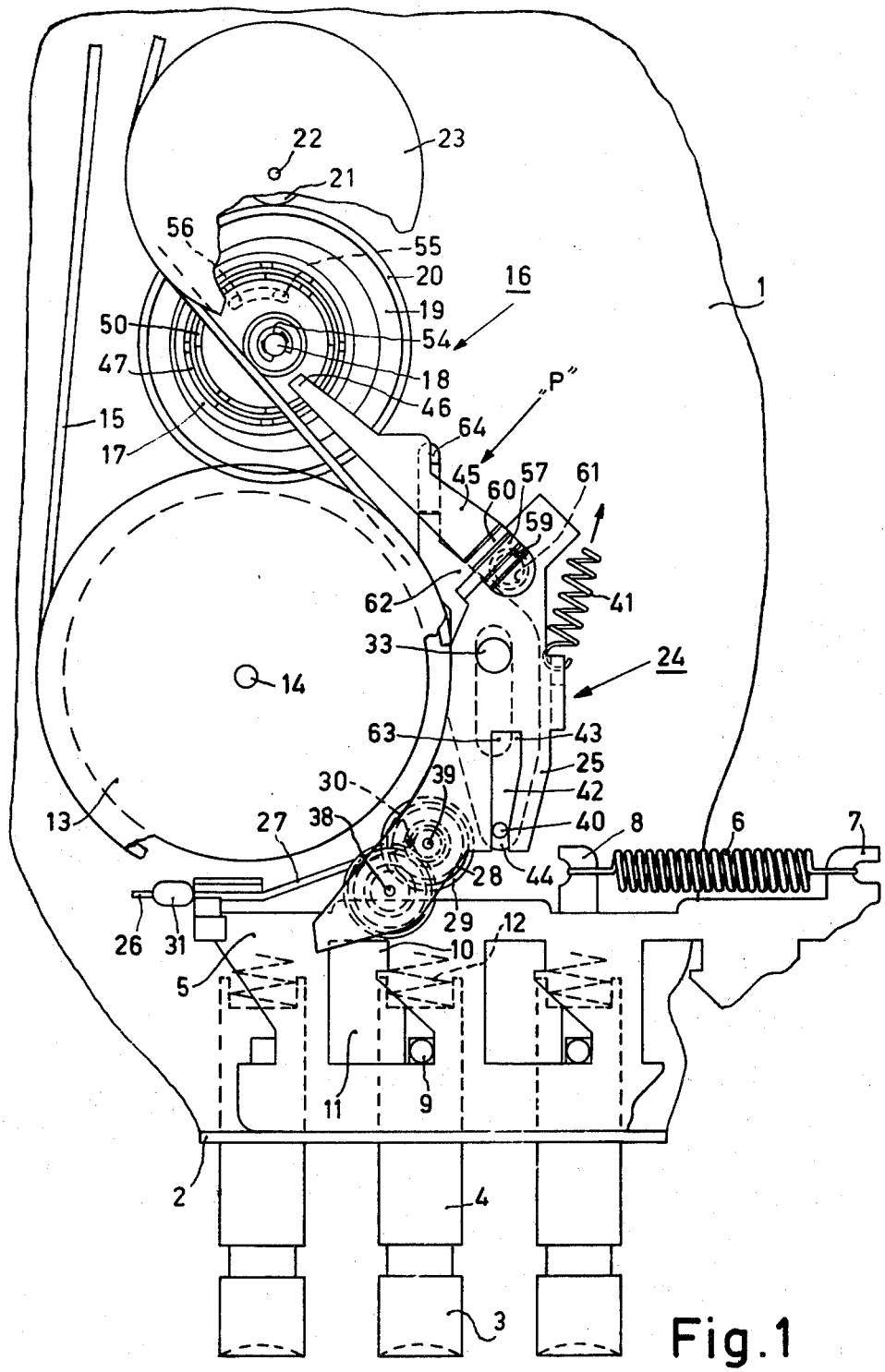
FIG. 1 is a bottom view of a portion of a cassette recorder, in which a stop device is employed which is pivotable about a fixed spindle, the play button of the apparatus not being depressed.
Figure 2:
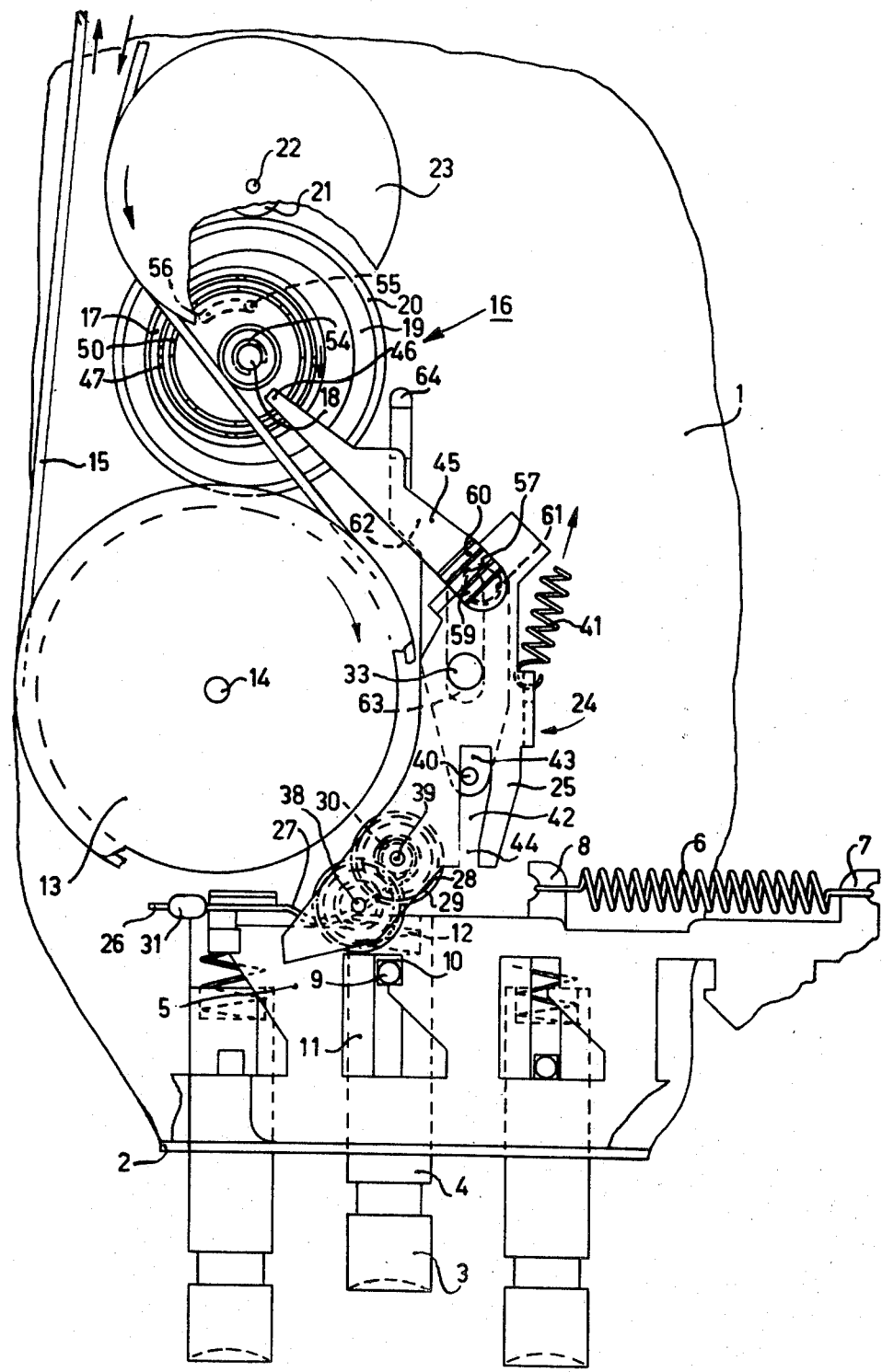
FIG. 2 is similar to the view of FIG. 1, but in the situation in which the play button is depressed.
Figure 3:
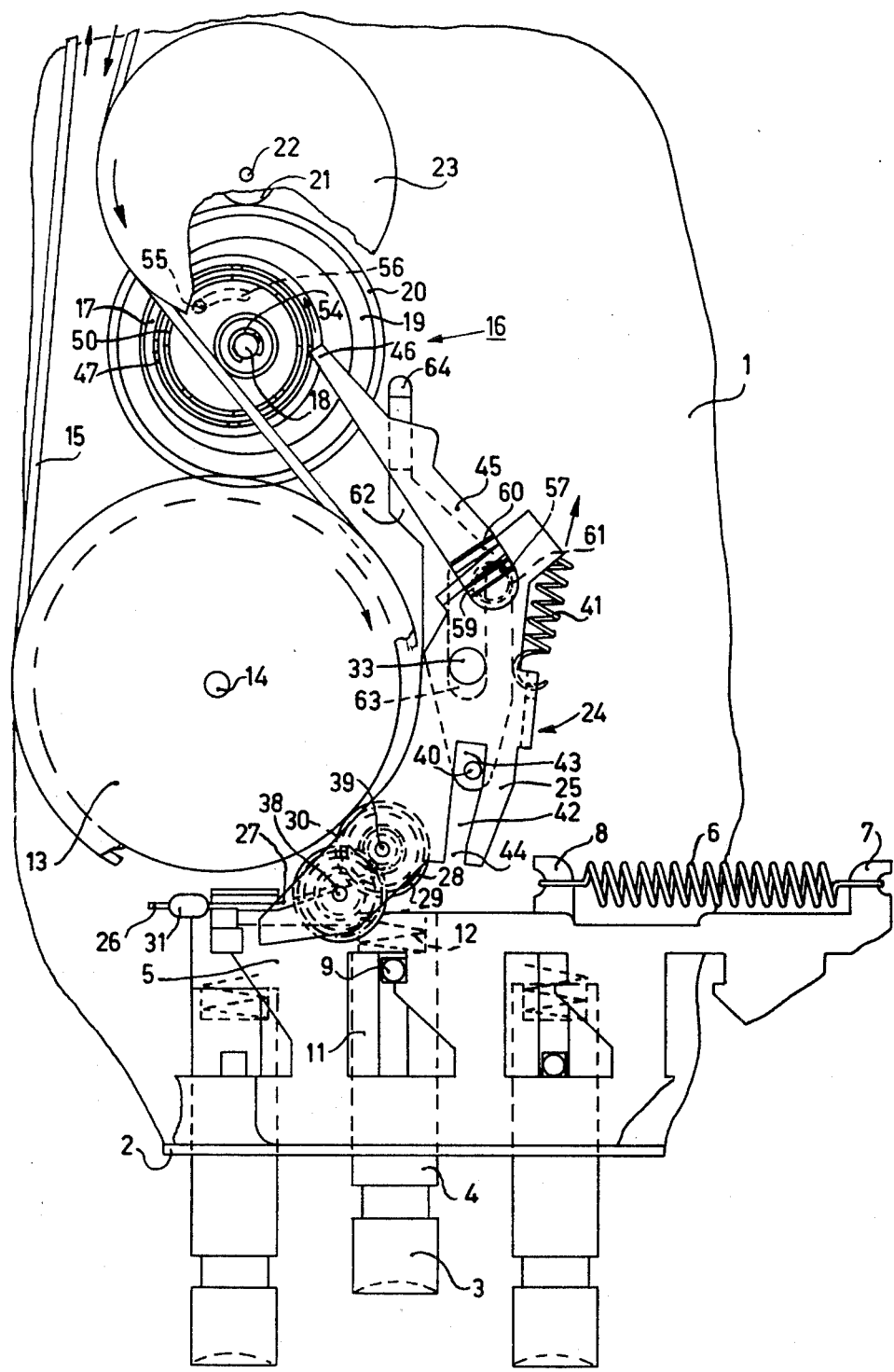
FIG. 3 is similar to the view of FIG. 2 but with the stop device in the position which it occupies just before the apparatus is switched off.

FIGS. 1, 2 and 3 show a part of a cassette recorder chassis 1 with a raised edge 2 on which chassis the other parts of the apparatus are mounted. The stop device is denoted by the general reference numberal 24. The apparatus includes a depressable play button 3 which is clamped onto a command member 4 which is movable by the play button. The movable and spring-loaded latching member, which cooperates with the command member in the depressed or operative position, is constituted by a latching slide 5. The slide is of a type commonly used in cassette recorders and is continuously biased to the left, as shown in the drawing, by a tension spring 6, which acts between a hook 7 on the latching slide 5 and a hook 8 connected to the chassis 1. In the depressed condition of the command member a raised pin 9 fastened to the command member 4 enters a recess 10 along the right side of an opening 11 in the latching slide and thus locks the command member in position. When the latching slide 5 is moved to the right the pin 9 is released and the command member 4 can be returned to its initial position under the influence of a pressure spring 12 which biases the member 4 outward.

A flywheel 13 is rigidly mounted on a capstan 14, which is rotatably journalled in the chassis 1. The flywheel is drivable by an electric motor (not shown) through a belt 15.

The tape stoppage detection device bears the general reference numberal 16. This device is a differential mechanism which comprises a component which during tape stoppage performs a movement which is characteristic of this condition. This component is constituted by an output drive disk assembly 17. For a more complete description of the differential mechanism 16, reference is made to Applicant's U.S. Pat. No.

3,737,600. The differential mechanism 16 is mounted on a spindle 18, which is rotatably journalled in the chassis 1. At the other side of the chassis a take-up reel-disk is mounted on the spindle 18. The spindle 18 is driven by a friction wheel 19 having a rubber rim 20 which engages a drive roller 21 rotatable around a fixed spindle 22 and integral with a pulley 23 which is also driven by the belt 15. The friction wheel 19 is coupled to the spindle 18 through a friction coupling of any well-known type, not shown, so that the friction wheel 19 and the spindle 18 may have different speeds, in known manner. The differential disk 17 performs a movement which is characteristic of tape transport or tape stoppage, that is, whether the spindle 18 is rotating or stationary respectively. This means that the tape stoppage detection device in fact detects stoppage of the take-up reel-disk. During tape transport the differential disk 17 rotates in the direction indicated by an arrow in FIG. 2, the spindle 18 then also having the direction of rotation indicated by an arrow, whilst during tape stoppage the situation represented in FIG. 3 occurs in which the differential disk rotates in the opposite direction, also indicated by an arrow.

Figure 4:
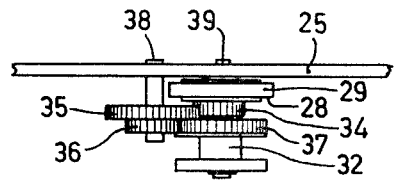
FIG. 4 is a side view of the gear reduction of the stop device used in FIGS. 1 through 3, FIG. 5 schematically represents the co-operation of the sensor of the stop device used in FIGS. 1 through 3 with the two cam rings of the differential mechansim in the situation that the two cam rings rotate in the direction which corresponds to tape transport, FIG. 6 schematically represents the cooperation of the same elements as in FIG. 5, but now for a direction of rotation of the differential mechanism which corresponds to tape stoppage.

The stop device 24 comprises an adjustable frame plate 27 which is moved by the tape stoppage detection device 16 during tape stoppage, with the result that the flywheel 13 in turn moves the latching member 5, by means of a force-transmitting member 27 which is connected to the latding member 5 at a first end 26, for unlatching it against the load of the spring 6. More particularly, as shown in FIGS. 3 and 4, a drive wheel 28 having a rubber rim 29 is rotatably journalled on the frame plate 25. Movement of the frame plate 25 during tape stoppage brings the rim 29 into contact with the flywheel 13 and the wheel 28 is thus set into motion. The force-transmitting member 27 consists of a flexible cord having a plastic thickened portion 31 provided at the first end 26. When a tensile force is exerted on the cord 27, the thickened portion 31 hits the latching slide 5, so that it can be unlatched. The second end 30 of the pulling cord 27 is attached to a winding drum 32, which is drivably coupled to the drive wheel 28 in a manner to be described hereinafter.

The frame plate 25 is pivotably journalled about a pivoting spindle 33, which is rigidly connected to the chassis 1. The second end 30 of the pulling cord 27 is coupled to the winding drum 32 at direction to one side of the pivoting spindle 33 that at least a component of the reaction produced in the pulling cord 27 by the drive system acts in a direction from the drive wheel 28 towards the flywheel 13, so that an increased of the tensile force in the cord 27 also means an increase of the force with which the rubber ring 29 of the drive wheel 28 is pressed against the flywheel 13. On the frame plate 25 a number of gear wheels 34, 35, 36 and 37 are rotatably mounted on spindles 38 and 39 rigidly connected to the frame plate 25. The gear wheels together form a reduction gear train, which reduces the speed of revolution of the drive wheel 28, to which gear 34 is attached, to a lower speed of revolution of the last reduction wheel 37 which is integral with the winding drum 32 to which the pulley cord 27 is attached.

Upon depression of the play button 3 the command member 4 not only moves the latching member 5 to the right via the pin 9 but, in a manner which is commonly used in cassette recorders and which is not shown in the drawing, also moves a unit at the other side of the chassis 1. The recording head, the erase head and the pressure roller of the cassette recorder are mounted on said unit, as is a pin 40 which projects through the chassis 1 and which is shown in FIGS. 1 through 3. The pin 40 projects through a slot 42 in the frame plate 25, and functions as a stop pin for the stop device 24. A tension spring 41 keeps the frame plate 25 elastically pressed against the stop pin 40 in the condition in which the frame plate is not moved by the tape-stoppage detection device (see FIG. 1). Said slot has a length which is greater than the stroke of the stop pin 40 and furthermore has a width at the location 43, where the stop pin 40 is situated when play button 3 is depressed (see FIGS. 2 and 3), sufficiently great to allow the frame plate 25 to freely perform its pivoting movement about the pivoting spindle 33 during tape stoppage; and at the location 44, where the stop pin 40 is situated when the play button 3 is unlatched (see FIG. 1), a width slightly wider than the stop pin 40. Between these two locations 43 and 44 the width of the slot 42 gradually decreases. The slot extends in such a direction that the frame plate 25, after the play button 3 has been released by the pulling cord 27, is returned from its position shown in FIG. 3 to its initial position shown in FIG. 1.

A sensor 45 is pivotally mounted on the frame plate 25, and has an end 46 projecting remote from the frame plate. Said end 46 of the sensor 45, at least during tape transport, resiliently bears against the output drive disk assembly 17 of the differential mechanism 16.

The output drive assembly 17 is provided with a circular raised, first cam-ring 47 which comprises a number of cams 48 with a sawtooth profile, which cams are arranged at some distance relative to each other, thus defining an interspace between them. During tape transport the cams 48 move in the direction towards the oblique rising edge 49 of the profile. Directly adjoining and concentric with the first cam ring 47, and rotatable relative thereto to a limited extent, a second cam ring 50 is provided. The second cam ring has raised cams 51 having a partially symmetrical sloping profile, also arranged at some distance relative to each other, thus defining an interspace between them. The slope $\alpha$ of the cams 48 and the slope $\beta$ of the cams 51 are substantially equal to each other.

Figure 5:
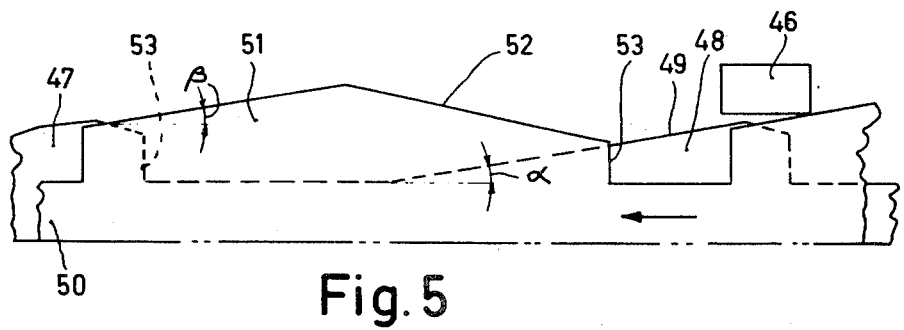

As shown in FIG. 5, during tape transport the second cam ring 50 is at an angular position relative to the first cam ring 47 in which the two profiles substantially coincide locally, so that the sensor 45 of the stop device 16 is first moved up against a gradually rising edge 49 of a sawtooth profile and is subsequently moved down along a falling edge 52 of a sloping profile, then arriving at the gradually rising edge of a next sawtooth profile etc. In FIG. 5 the arrow represents the direction of rotation of the two cam profiles relative to the stationary end 46 of the sensor 45. During tape stoppage the situation of FIG. 6 occurs, in which the second cam ring 50 is rotated with respect to the first cam ring by the sensor 45 until the sensor hits the steep edge 53 of an interspace adjoining a cam 48 of the first cam ring 47.

The cam disk 50 is freely rotatable on the spindle 18 of the differential mechanism 16 and is axially locked relative thereto by means of a retaining ring 54. Both the first cam ring 47 and the relatively rotatable cam ring 50 are made of a synthetic material. The cam ring 50 comprises a pin 55 at its underside, which pin fits a sector-shaped slot 56 of the stationary ring 47. The ends of said slot serve as stops for the ring 50, so that said ring is rotatable relative to the ring 47 to a limited extent only.

Figure 7:
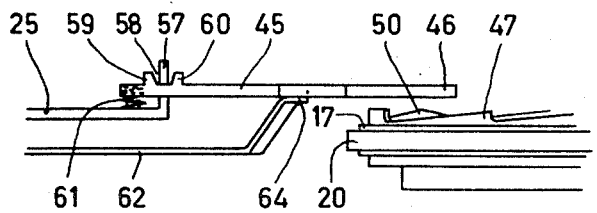
FIG. 7 shows a detail of the stop device in an elevation in accordance with the arrow $p$ in FIG. 1.

The sensor 45 is pivotably journalled to the frame plate 45 about an axis substantially parallel to the frame plate. For this purpose the frame plate 25 is provided with a bent portion which serves as the knife edge 57 of a knife-edge bearing for the sensor (also see FIG. 7). The sensor 45 is provided with a corresponding knife edge fulcrum 58 which is located between two raised lips 59 and 60 which are integral with the plastic sensor. A pressure spring 61 mounted between the frame plate 25 and the sensor 45 provides resilient loading of the pivotable sensor 45, for maintaining contact, at least during tape transport, of the end 46 of the sensor 45 with the two cam rings 47 and 50. A sliding plate 62 is mounted on the stop pin 40 which is coupled to the command member 4. Said plate 62 has a slot 63 through which the pivoting spindle 33 for the frame plate 25 projects. At an end remote from the pin 40 the sliding plate 62 is provided with a sensor lifting cam 64. When the play button 3 is depressed, see FIGS. 2 and 3, the lifting cam 64 leaves the sensor 45 free. When the play button 3 is released, see FIG. 1 and FIG. 7, the sensor 45 is lifted off the drive assembly 17 by the lifting cam 64, thus disabling the stop device 24 and enabling unimpeded fast winding of the tape in the cassette in both directions.

Figure 6:
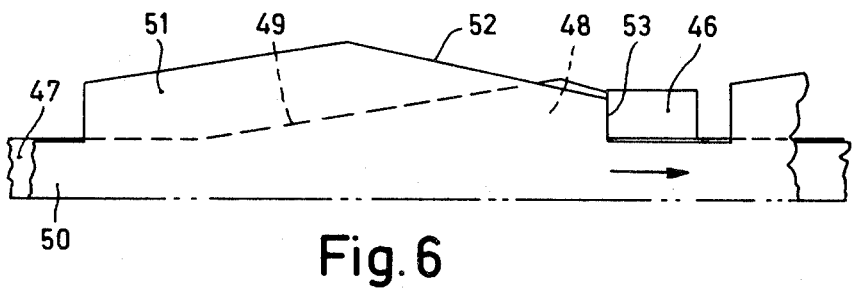

The operation of the cassette recorder is as follows: when the play button 3 is depressed, the command member 4 is moved from its position shown in FIG. 1 to the latched position shown in FIGS. 2 and 3. Moreover, the stop pin 40 and the sensor lifting cam 64 are moved over the same distance. The head unit, at the other side of the chassis 1 and not shown in the drawing, is moved towards the cassette and the motor, not shown, is started. As a result, the belt 15 is driven in the direction indicated by the arrows in FIGS. 2 and 3, so that the pulley 23, the drive roller 21, the friction wheel 19 and the flywheel 13 are rotated. The sensor 45 then moves over the cams 48 and 51 of the cam ring 47 and 50 in the manner shown in FIG. 5. As a result, the stop device 24 is subjected to a torque which presses the frame plate 25 against the stop pin 40, and at the same time the tensile force in the spring 41 pulls the frame in the same direction. Upon tape stoppage, as the motor is not switched off, the pulley 23, the drive roller 21, the friction wheel 19 and the flywheel 13 are still driven and the direction of rotation of the drive assembly 17 is reversed (FIG. 3). Because of this reversal, the sensor 45 is initially subjected to a frictional force which results in a pivoting moment on the frame plate 25 in such a direction that the plate tends to pivot towards the flywheel. However, the frictional force is too small to overcome the counteracting torque which is produced by the tension spring 41. It is not until the situation of FIG. 6 is obtained, in which the sensor end 46 makes contact with a steep edge 53 of a cam 48 of the stationary cam ring 47, that the pivoting moment becomes so great that the frame plate 25 is pivoted about the pivoting spindle 33 and the rubber rim 29 of the drive wheel 28 is brought into contact with the circumference of the flywheel 13. As a result, the reduction gear formed by the gear wheels 34 through 37 is set into motion, so that the end 30 of the pulling cord 27 is wound onto the winding drum 32. As soon as the pulling cord 27 has been wound so far that the cord is taut, the tensile force produced in the pulling cord will contribute to the pressure of the rubber rim 29 against the circumference of the flywheel 13 and increase the tensile force to such an extend that the spring 6 and the friction that occurs can be overcome, after which the latding slide 5 can be moved sufficiently far to release the command member 4. Under the influence of the pressure spring 12 the command member 4 is returned from its position shown in FIG. 3 to the position shown in FIG. 1. Moreover, the stop pin 14 and the sensor lifting cam 64 are moved over the same distance. By the pin 40, which slides in the slot 42 of the frame plate 25, said plate is also returned around the pivoting spindle 33 from its position shown in FIG. 3 to the position shown in FIG. 1. The head unit at the other side of the chassis 1 is simultaneously moved away from the cassette and the apparatus is switched off. Thus, the initial situation of FIG. 1 is restored.

Although the drawing only relates to a single embodiment of the invention, some other embodiments which are not shown in the drawing will be obvious to those skilled in the art. For example, the pulling cord 27 may be replaced by a different force-transmitting member, for example a gear rack, which is pressed against the gear wheel 37 by spring force and which with its first end presses against the latching slide 5 at a location at the other side of the frame plate 25, such as the location where the thickened plastic portion 31 acts on the latching slide. Furthermore, modifications are readily conceivable in which the frame plate 25 is not pivotable but for example slidable. Furthermore, many other tape stoppage detection devices may be used, which impart a movement to the frame plate 25 during tape stoppage. These and similar embodiments are also considered to be within the scope of the invention.

What is claimed is:

1. In a tape recorder comprising:
   a chassis;
   a command member movably connected to the chassis and biased toward a switched-off position;
   means for moving the commmand member to an operative position;
   biased latching means for latching said command member in the operative position;
   a flywheel mounted to the chassis for rotation;
   means for rotatably driving the flywheel and for causing transport of tape in said tape recorder;
   means for detecting stoppage of tape transport while said command member is in said operative position, and
   means responsive to said detecting means, for switching off said driving means, comprising a frame plate movably mounted to the chassis for a given motion from an initial position upon detection of tape stoppage, a force transmitting member arranged to operatively engage said latching means so as to unlatch said command member, and means for applying operative force to said force transmitting member in response to said given motion of the frame plate,
   the improvement comprising:
   a drive wheel rotatably journalled on the frame plate, and means responsive to said given motion for engaging said drive wheel for frictionally driven rotation responsive to the flywheel rotation, and wherein
   said force transmitting member is drivably coupled to said drive wheel for applying said operative force to said force transmitting member.

2. A tape recorder as claimed in claim 1 wherein said frame plate, drive wheel and force transmitting member are so arranged that application of operative force to the force transmitting member increases the frictional driving force of the drive wheel.

3. A tape recorder as claimed in claim 2 wherein said means for applying force further comprises a winding drum and means coupling said winding drum to said driving wheel for rotation responsive to driving wheel rotation, and said force transmitting member consists of a flexible tension member having an end attached to the winding drum.

4. A tape recorder as claimed in claim 3 wherein said means for applying force comprises a spindle attached to the frame plate, the winding drum and the drive wheel being both journalled on said spindle.

5. A tape recorder as claimed in claim 4 wherein said means for applying force further comprises a reduction gear train operatively coupled between said driving wheel and said winding drum such that said drum rotates at a lower speed than the wheel.

6. A tape recorder as claimed in claim 1 wherein said frame plate has a slot having a length greater than a stroke of the command member as the command member moves from the operative position to the switched-off position, said slot extending longitudinally generally in the direction of said stroke,
said command member includes a stop pin protruding therefrom and arranged to project through said slot, and
said switching off means comprises a spring for biasing the frame plate in a direction opposite to said given motion,
said slot having a width, at a location where the stop pin is situated when the command member is in the operative position, sufficiently great to allow the frame plate to undergo said given movement; a width at a location where the stop pin is situated when the command member is in the switched-off position, only slightly wider than the stop pin, so arranged that said frame member is held in said initial position; and between said locations said slot width changing gradually such that, upon movement of the command member from the operative position to the switched-off position in response to detection of tape stoppage, the frame plate is returned to the initial position by engagement to the stop pin.

7. A tape recorder as claimed in claim 1, wherein said detecting means comprises a differential rotary motion mechanism having an output drive assembly which rotates in a first direction during normal tape transport in response to said command member being in the operative position, and in an opposite second direction in response to tape stoppage; and
said switching-off means comprises a sensor element pivotally connected to the frame plate and having an end remote from the frame plate, and means for resiliently engaging the sensor end with the output drive assembly at least while said command member is in the operative position.

8. A tape recorder as claimed in claim 7 wherein said output drive assembly comprises:
a disk having a first cam ring having a number of cam teeth with sawtooth profiles and an interspace between adjacent cam teeth, so arranged that during normal tape transport the gradual sloping sawtooth surface leads the steep edge;
a second cam ring mounted concentrically with said first cam ring and having a number of cam teeth with generally symmetrical sloping profiles, and an interspace between adjacent cam teeth; and
means for coupling said second cam ring to said first cam ring for common rotation with a given difference in relative angular position of the cam rings with respect to each other for opposite directions of rotation, such that when rotating in said first direction corresponding to normal transport, sloping profiles of the second cam ring teeth are aligned with respective interspaces of the first cam ring so that said sensor end engages sloping surfaces only; and such that when rotating in the opposite direction, frictional drag of the sensor end bearing on the assembly retards rotation of one of said cam rings by said given difference in position thereby aligning interspaces of the cam rings, so that said sensor end engages said interspace and is moved such that the frame plate undergoes said given motion.

9. A tape recorder as claimed in claim 8, wherein said sloping profiles of the second cam have a slope equal to that of the gradual sloping sawtooth surfaces, when rotating in said first direction each gradual sloping sawtooth surface being conincident with a respective second cam ring sloping profile.

10. A tape recorder as claimed in claim 8, wherein said frame plate is connected to the chassis for pivotal movement about an axis parallel to rotational axes of the flywheel and the differential rotary mechanism, and the sensor arm is pivotal with respect to the frame plate about an axis transverse to said axes; and the command member further comprises a sensor lifting cam which is arranged so as to lift the sensor end off the output drive assembly when the command member is in the switched-off position.

11. A mechanism for moving an element in response to stoppage of a shaft rotation, comprising:
a chassis;
a shaft journalled to said chassis for rotation;
a differential rotary motion mechanism mounted on said shaft, having an output drive assembly which rotates in a first direction during rotation of said shaft in a given direction, and in an opposite second direction in response to stoppage of said shaft;
a member mounted to said chassis so as to allow motion with respect to said chassis in first and second orthogonal directions, and having an end;
means for biasing said member in said first orthogonal direction so as to resiliently engage said output drive assembly; and
means for moving an element responsive to movement of said member in said second orthogonal direction;
wherein said output drive assembly comprises:
a disk having a first cam ring having a number of cam teeth with sawtooth profiles and an interspace between adjacent cam teeth, so arranged that during rotation of said shaft in said given direction the gradual sloping sawtooth surface leads the steep edge;
a second cam ring mounted concentrically with said first cam ring and having a number of cam teeth with generally symmetrical sloping profiles, and an interspace between adjacent cam teeth; and
means for coupling said second cam ring to said first cam ring for common rotation with a given difference in relative angular position of the cam rings with respect to each other for opposite directions of rotation, such that when rotating in said first direction corresponding to said given shaft direction, sloping profiles of the second cam ring teeth are aligned with respective interspaces of the first cam ring so that said member end engages sloping surfaces only; and such that when rotating in the opposite second direction, frictional drag of the member end bearing on the assembly retards rotation of one of said cam rings by said given difference in position thereby aligning interspaces of the cam rings, so that said member end engages said interspace and said member is moved in said second orthogonal direction.

12. A mechanism as claimed in claim 11 wherein said sloping profiles of the second cam have a slope equal to that of the gradual sloping sawtooth surfaces, when rotating in said first direction each gradual sloping sawtooth surface being coincident with a respective second cam ring sloping profile.

13. A mechanism as claimed in claim 11, comprising a frame plate connected to the chassis for pivotal movement about an axis parallel to rotational axes of the shaft and differential rotary mechanism, said member being pivotally mounted to said frame plate about an axis transverse to said axes; wherein said mechanism further comprises means for selectively moving said member in opposition to said biasing about said transverse axis so as to move said member out of engagement with the output drive assembly, whereby said mechanism is disabled and insensitive to rotation of the shaft in a reverse direction.

* * * * *